United States Patent [19]

Pedersen et al.

[11] Patent Number: 5,366,625
[45] Date of Patent: Nov. 22, 1994

[54] CARTRIDGE OF HYBRID UNITARY WAFERS OF HOLLOW FIBER MEMBRANES AND MODULE CONTAINING A STACK OF POST-POTTED CARTRIDGES

[76] Inventors: Steven K. Pedersen, 498 Rothesay Pl., Burlington, Ontario L7N 3E2; Christopher J. Lipski, 75 Royal Avenue, Burlington, Ontario L8S 2C6; Pierre L. Cote, 22 Pearl Street South, Hamilton, Ontario L8P 3W5, all of Canada

[21] Appl. No.: 992,560

[22] Filed: Dec. 18, 1992

Related U.S. Application Data

[63] Continuation-in-part of Ser. No. 845,641, Mar. 4, 1992, Pat. No. 5,232,593.

[51] Int. Cl.$^5$ .............................................. B01D 63/00
[52] U.S. Cl. ............................... 210/321.78; 210/232; 210/321.61; 210/321.79; 210/321.8; 210/321.87; 210/321.88; 210/321.89; 210/500.23; 210/292; 210/293
[58] Field of Search ....................... 210/321.78, 321.88, 210/321.61, 321.79, 321.8, 321.87, 500.23, 232; 156/292, 293

[56] References Cited

U.S. PATENT DOCUMENTS

| | | | |
|---|---|---|---|
| 3,342,729 | 12/1964 | Strand | 210/23 |
| 3,993,816 | 11/1976 | Baudet et al. | 428/45 |
| 4,959,152 | 9/1990 | Nichols | 210/651 |
| 5,104,535 | 4/1992 | Cote et al. | 210/321.8 |
| 5,164,081 | 11/1992 | Nichols et al. | 210/500.23 |
| 5,174,900 | 12/1992 | Nichols et al. | 210/500.23 |
| 5,182,019 | 1/1993 | Cote et al. | 210/321.89 |

Primary Examiner—Robert A. Dawson
Assistant Examiner—Ana M. Fortuna
Attorney, Agent, or Firm—Alfred D. Lobo

[57] ABSTRACT

A module is disclosed for use as a membrane device, comprising, a shell with fluid couplings removably affixed to each of its ends and at least one non-disassemblable cartridge operably held within the shell. The cartridge is constructed from plural wafers sequentially coaxially aligned, each wafer consisting essentially of a generally planar frame and an array of hollow fibers of selectively permeable material adhesively held by their ends in opposed portions of the border of the frame, without initially potting the ends. Each frame has a central through-passage, and multiple frames together define an axial through passage in each cartridge through which a feedstream is typically flowed in "outside-in" flow. Each opposed portion of border is provided with longitudinal, laterally spaced apart grooves in its upper surface and the fibers trained in the grooves, and successive wafers are bonded together. The bores of the fibers are in open fluid communication with the permeate zone in the shell. Arrays lie in a plane substantially orthogonal to the direction of flow of the feedstream, and fibers of one array are staggered relative to those in a successive array. The ends of the fibers are post-potted by filling a potting channel formed by elongated slots in opposed portions of the borders of successive frames, the ends of which successive slots are in open fluid communication. Several cartridges may be coaxially "ganged" or "stacked" to provide the required filtration area. The cartridges may be removably disposed in the shell, or secured therein so that the entire module may be discarded when its efficiency is unacceptably low.

26 Claims, 11 Drawing Sheets

CARTRIDGE OF HYBRID UNITARY WAFERS OF HOLLOW FIBER MEMBRANES AND MODULE CONTAINING A STACK OF POST-POTTED CARTRIDGES

This invention is a continuation-in-part application of Ser. No. 845,641 filed Mar. 4, 1992, now U.S. Pat. No. 5,232,593.

BACKGROUND OF THE INVENTION

This invention is specifically directed to an improvement of the cartridge, and module in which the cartridge is used, both disclosed in our parent application. "Cartridge" refers to an assembly of "wafers" which assembly is constructed by sequentially assembling frames and monolayer arrays, seriatim. We sought to form a cartridge which could be "ganged" with other cartridges to form a "stack" in a module, using appropriate gasket means for disassembly of the cartridges, if disassembly was desired. The parent cartridge was assembled with plural unitary wafers each having a continuous, imperforate border. Since a serviceable cartridge is expected to provide "zero defect" service over its expected life time, the cost of maintaining "zero-tolerances" required for constructing each wafer as it was incorporated into the cartridge, becomes difficult to pass on to the end user of a module in which the cartridges are used.

This invention is directed to a cartridge of more economical construction, made possible because it is less demanding as to tolerances without sacrificing "zero defect" service. Such service is made possible because the cartridge is made with wafers, each having a continuous, but perforate or "slotted" border. The term "wafer", and more specifically "slotted wafer", is used in the invention claimed herein, to refer to an array of a single layer of laterally spaced-apart fibers secured in a frame bounded by a continuous border having at least two opposed elongate through-passages or "slots" within opposed portions of the border. Opposed terminal end portions of the fibers are held in the opposed, now "slotted" border portions. The cartridge comprises at least three, typically from 10 to 200, that is, a multiplicity of unitary wafers assembled seriatim, one in congruent contact with another, in a cartridge. The vertically aligned slots of successive wafers, the ends of which slots are in open fluid communication with each other in a cartridge of wafers, are potted after the cartridge is constructed. The vertically aligned ends of successive slots, and the slots themselves, together function as a "potting channel". Because the potting channel is "filled with resin" after the cartridge is assembled, the cartridge is referred to as being "post-potted". When post-potted, a fluid-impermeable continuous annular shell of potting resin is formed within the cartridge, the annular shell surrounding the fibers.

The term "fiber" is used herein, for brevity, to refer, both, hollow fiber organic polymeric membranes, and also to hollow fiber ceramic/metallic (ceramic, or metallic, or both) membranes, except when the latter is specifically referred to. Under such a circumstance, because ceramic/metallic membranes are typically much larger in diameter than organic polymeric fibers, the ceramic/metallic hollow fiber membranes are also referred to as "hollow tube membranes".

Though numerous embodiments of framed hollow fiber membranes (referred to as "fibers" for brevity) have been disclosed in this art, and much effort has been expended to provide a "wafer" or "cell" which can be vertically assembled, one in direct contact with the other, and upon it (referred to herein as being "stacked" to form a module), the effort has not resulted in a sufficiently cost-effective module which is reliable, rugged and has wide commercial applications. The term "cell" is used to refer, in addition to an array, in a more general sense, to a prior art assembly of fibers within a frame.

It will be noted that each wafer is not a cell since an individual wafer has no meaningful existence. The wafers come into existence only when stacked to form a cartridge. Unlike in the prior art, an assembly of stacked wafers cannot be used until the uppermost array of fibers is covered with an end cap. In other words, the minimum "unit" of this invention is neither a cell nor a wafer but a cartridge.

As will be explained in greater detail herebelow, the construction of a cartridge of slotted wafers was not taught in the prior art for a number of inter-related reasons, not the least of which was that the art suggested neither why nor how such a slotted cartridge could be constructed, nor did the art intimate the benefits of such construction.

In the particular instance when the membrane is in the form of a capillary tube or hollow fiber, and used for filtration, the membrane-material divides the module into a "feed zone" and a "non-feed zone", the latter referred to as the "permeate zone" regardless of whether the module is used in a filtration application. The feed which is introduced either externally (referred to as "outside-in" filtration) or internally ("inside-out" filtration) of the fibers, is resolved into "permeate" and "concentrate" streams. Many physical considerations affect the operation of a module. For example, the permeability and rejection properties of the membrane; the process flow conditions such as pressure, rate of flow, temperature, etc.; the physical and chemical properties of the feed and its components; the relative directions of flow of feed and permeate; the thoroughness of contact of the feed with the walls of the fibers; and other parameters, each has a direct effect on the efficiency of the module. The goal is to maximize the efficiency of the module and to do so in a practical and economic manner.

Readily apparent is that channelling of the feed due to uneven distribution of the fibers will result in substantially poorer performance of the module than if the feed flowed evenly over the surface of each fiber in the bundles of fibers. Since the rate of transfer of the desired component of the feed from one side of the membrane to the other is necessarily relatively slow, to obtain an optimum rate of transfer requires maximizing the surface area of the membrane and maintaining an effective driving force such as a concentration or pressure differential between opposed surfaces of the fibrous membrane. As a result it becomes essential to use a multiplicity of long fibers of small diameter within the casing (shell) of a module so as to minimize the void (unoccupied space) therewithin without packing the fibers together too tightly, and to use as high a fluid velocity or pressure differential as the physical and economic circumstances will permit. But long fibers are susceptible to damage, the longer the fiber, the greater the susceptibility.

If the fibers are packed too tightly in "outside-in" filtration, the throughput of feed cannot be increased in proportion to the number of fibers used because of the increased pressure drop. If the length of fibers is increased too much the resistance of the flow path within the bores of the fibers becomes a limiting factor which limits the throughput of feed, though the pressure drop through the bundle of fibers in the module may not be a factor.

In the particular instance of filtration, using such "outside-in" flow of feed, not only does the feed flow through the path of least resistance, namely the largest voids, but it will also tend to collect in some voids from which flow is impeded. The result is that the concentration of a residual component ("residue") remaining on the outside of the fibers ("concentration polarization"), increases. Some of the residue will pass through the walls of the fibers and increase the concentration of the residue impurity in the permeate. If the residue is a salt, some, when concentrated will precipitate on the fibers' surfaces reducing their effective area available for permeation, a phenomenon known as "fouling".

To counter the problems of poor flow of feed through a module and the resulting inefficient mass transfer of the permeate across the membrane, numerous schemes have been suggested, some more practical than others. All are characterized by a conspicuous absence of details as to packing efficiency of the fibers in the module, and most particularly, how one might "fix" the orientation of the large number of fibers required in a practical module.

Routinely, fibers are "potted" near one, or near opposed ends, in a hardened synthetic resinous "header" which is adapted to be inserted with suitable gasketing means, in fluid-tight engagement with the interior wall of the casing of the module. A conventional potting procedure is to insert the terminal portions of a multiplicity of vertically oriented fibers in laterally slightly spaced-apart relationship with one another, with a first set of one ends of each of the fibers pointing down, into an appropriately shaped container of potting resin (approximately the shape of a header). The inner walls of the container are coated with a release agent before the resin is poured into the container. The first set of one (first) ends of the fibers are held in position until the resin cures and a header of cured resin is removed. The end surface of this first header is then cut off exposing the open ends of the fibers in the face of the header. The face of this first header then appears foraminous because of the planarly disposed, exposed ends of the fibers, the solid resin forming a seal around the exterior terminal portions of each fiber.

The same procedure is then repeated to form a second header with the other (second) set of the other ends of the bundle of fibers. The headers may then be secured in fluid-tight engagement within each end of a shell to form a module.

Another option is to pot both sets of ends of the fibers in the same header by wrapping the fibers around one end of a frame having elevated elongated sides, as was done by Baudet et al in U.S. Pat. No. 3,993,816. With this arrangement one hopes to gain more from packing a large number of fibers into each frame, by curing one layer of fibers, then placing another (second) layer in staggered relationship with the fibers of the preceding layer, and curing the second layer, than one sacrifices in the non-productive bends of the fibers.

In addition to coping with the problem of positioning a large number of fibers precisely before they are potted, there are numerous pitfalls in conventionally "potting" the terminal portions of fibers in a resin which can be solidified. To begin with, one must find a resin which is sufficiently compatible with the fibers as to form a fluid-tight bond which will survive over the useful life of the module. After having found such a resin one must make sure that movement of the fibers near the resin does not damage the fibers due to the shearing action of the solid resin on their terminal portions, particularly if the pressure differential to be used in the module is substantial. Further, cutting and dressing the solid resin to expose the ends of the fibers may result in plugging many of the fibers.

For example, Nichols in U.S. Pat. No. 4,959,152, states "Hollow fiber membranes may be conveniently mounted in annular or similar frames or retainers having a continuous perimeter and an open central portion. The fibers are strung across the open central portion of the frame and the ends are embedded in the retainer thereby forming a wafer. The ends of the fibers are exposed at the outside surface of the retainer, giving access to the interior of the fibers, while the outside surfaces of the fibers are accessible in the open central portion of the retainer." (see col 1, lines 57–66). Soon thereafter he states "Tight sealing of adjacent wafers is essential to avoid contamination of retentate and permeate." Though not explicitly stated, Nichols recognized the importance of sealing plural layers of fibers in each wafer effectively, because he constructed a device to centrifuge an epoxy resin of appropriately chosen viscosity and quick-setting characteristics, to generate a potting ring through which the ends of the fibers protrude to discharge fluid flowing through the lumens of the fibers.

The effectiveness of the centrifugal force however was not restricted to ejecting the epoxy resin radially outward to be deposited against the inner periphery of his mold; the centrifugal force also displaced the fibers in each layer resulting in uncontrolled spacing of fibers and "gaps" which invite channeling. To counter such displacement, individual fibers running parallel to each other in the weft direction in each layer, were woven together ("tied") with warp filaments to form a flat sheet; or, each layer of fibers was adhesively secured to a contiguous layer with a suitable adhesive coated filament placed on the upper and lower surfaces, respectively, or both, of each layer (see col 4, lines 56–66). Tying fibers together results in chafing at the "ties" and premature rupture of the chafed fiber; and, in entrapment of solids in a "cage" formed by the axial zone between tied fibers.

Since our concern was to construct a wafer carrying but a single layer ("monolayer") of parallel, spaced-apart fibers without tying them together or interconnecting them, but securing them to a frame in fluid-tight spaced-apart relationship at their terminal portions, the problem of confining those terminal portions had little in common with the problem so recently solved by Nichols, namely of securing multiple layers by forming inner and outer potting rings of centrifuged resin, and removing the outer one.

More than a score of years earlier, Strand in U.S. Pat. No. 3,342,729 had to use a mesh of fibers which he sandwiched between two extruded or cast frame members, formed from a suitable thermoplastic polymeric material. The reason he was forced to use a mesh was because such a configuration of meshed fibers had inherent stability, one fiber reinforcing another in the same layer or cell of fibers. A multiplicity of individual, loose fibers, if held only near their opposed terminal end portions, do not have such stability. The stability afforded by the mesh is sufficient to allow the fibers (as a portion of mesh) to be handled and positioned between the frame members. Strand did not suggest positioning individual fibers, in side-by-side relationship between the frame members nor could he have done so without envisioning the possibility of providing an essentially planar array of fibers between frame members. The fibers as a mesh, when sandwiched between two frame members, is referred to as a "cell" in Strand's invention. By "array" we refer to a multiplicity of substantially linear fibers, individually secured in laterally spaced-apart coplanar relationship on the border, without stabilizing the fibers by interconnecting them to one another.

Strand suggested making a cell as follows: "A mesh membrane can be sandwiched between two such (frame) members and the assembly subjected to heat sealing conditions whereby a unitary, integral cell member is provided. This means has the added feature of readily and securely bonding the members into an intimate joined relationship, but additionally avoids the need for any adhesive and sealant material and the attendant setting or drying time. Means can also be provided to simultaneously heat-seal the ends of any fibers protruding beyond the outer edge of the joinder of the two frames by causing the material of the frame to flow over the joinder forming a smooth surfaced seamless edge. Care must be exercised that the fibers are not materially altered in any portion where flow therethrough is desired. The frames can be made in pairs with mating male and female fittings such as lugs and indents to facilitate and assure alignment of the various matching openings. Rapid production of the cells can be achieved by the foregoing means." (see col 7, lines 12–30).

Strand's only description of the actual technique he used to form a cell required that the sides of a frame be coated with adhesive such as an epoxy resin, and the mesh (which is cut slightly larger than the frame) be sandwiched in the adhesive between the frame members until the mesh is securely and permanently bound to the frame members. Irrespective of how the mesh is held between frame members, the fibers chafe one another at the contact points when the module is used (placed in service), and, sooner rather than later, the chafed fibers fail.

Because Strand provided peripheral flow channels in the sides of the frame, which channels could not be in fluid communication with the central opening of the frame, it was essential that there be no leakage of fluid through openings or channels in a "sealed zone" of any frame. The sealed zone of a frame is defined as the space between opposed frame members, which space is to be filled with fibers which are sealingly secured in adhesive around the fibers.

The problem we addressed was quite different from the one addressed by Strand. We sought to form a cartridge of stacked wafers, each wafer consisting of an array of a single layer of substantially coplanar, non-displaceable, individual, essentially linear fibers; supported in a substantially coplanar unitary laminar frame having a continuous but perforate or "slotted" border.

The vertical spacing between the frames of essentially contiguous wafers in a cartridge is most preferably, insignificant, being only the thickness of adhesive, if an adhesive is used; and, being none (zero vertical spacing) when the lateral surfaces of frames of a cartridge are solvent-bonded, or bonded with ultrasonic waves, or the like. The vertical spacing between next-adjacent wafers is significant when successive wafers are separated by a gasket means, the spacing being the thickness of the gasket. In all cases, the fibers of successive wafers are in vertically spaced-apart relationship with each other, the magnitude of the spacing depending upon the bonding means used to bond successive arrays in a cartridge.

In the wafer we sought to construct, the fibers were also to be in laterally spaced-apart relationship without being secured to one another intermediate their terminal portions, either to adjacent fibers in a specific array, or to adjacent fibers in an array above or below the specific array. Fibers in contact with each other not only decrease the effective area of a module of multiple wafers, but also exhibit a proclivity to chafe against each-other, as stated hereinabove. Still further, we sought to provide a post-potted cartridge of multiple wafers, each with a unitary frame preferably distinct from the adhesive which secures the fibers to the frame, and to avoid the problems and cost of machining one centrifuged (outer) layer of resin in which the ends of the fibers are plugged, to expose another centrifuged (inner) layer of resin in which the ends of the fibers are not plugged, as in the Nichols cell.

The significance and importance of securing loose, individual linear fibers in each array of coplanar fibers having generally parallel longitudinal axes, is better appreciated by referring to numerous prior art cells in which fibers are looped about a frame before their ends are secured by potting them. Even before Strand's invention teaching opposed headers in the periphery of each cell, Lewis et al in U.S. Pat. No. 3,198,335 taught a cell in which fibers were also secured in a "header" of the cell, in loops or "hanks", rather than individually, and at least one end of each loop was secured by being potted in resin to form the header. (see col 6, lines 16–30). The desirability of using loops in a cell construction having a header built into the cell, was reinforced twenty years later in an improvement by Ostertag in U.S. Pat. No. 4,440,641. In the construction of such cells, the fibers must be looped because there is no other means for holding the fibers in place before they are potted, and it is self-evident that the fibers must be held in place before they are potted.

In addition to coping with the problem of positioning a large number of fibers precisely before they are potted, there are numerous pitfalls in "potting" the terminal portions of fibers in a fluid resin which is to be solidified. To begin with, one must find a resin which is sufficiently compatible with the fibers as to form a fluid-tight bond which will survive over the useful life of the module. After having found such a resin, one must make sure that movement of the fibers near the resin does not damage the fibers due to the shearing action of the solid resin on their terminal portions, particularly if the pressure differential between the feed zone and the permeate zone in the module during its use, is high enough to cause damage. Further, cutting and dressing the solid resin to expose the ends of the fibers may result in plugging many of the fibers, and is to be avoided.

As if these problems were not enough, one has to cope with the geometry of the frame, the lateral surfaces of which are to support each array of fibers, whatever the array's configuration, in a cartridge of wafers, or a stack of cartridges, to be housed in a module. This required development of a technique (a novel method) for securing the terminal portions to the border of the frame in such a manner as both, to facilitate potting of those terminal portions of the fibers, and also to provide adequate support only at the terminal portions, to enable them to be bonded to the frame.

It will be appreciated that, though the description of the invention herein is for "outside-in" filtration of feed, the fiber array and a module containing a cartridge of arrays, or a stack, may be equally well adapted for "inside-out" filtration, for those process considerations which demand such flow.

The module containing a cartridge or stack of our invention, the method of constructing the wafer, the cartridge, and the stack, and the effectiveness of each of the foregoing in a variety of permeation processes, address the deficiencies of the prior art.

SUMMARY OF THE INVENTION

It has been discovered that a cartridge of slotted wafers each carrying a monolayer of hollow fiber membranes ("fibers" for brevity) in a geometric array, on a planar surface of a unitary laminar frame (also referred to as a "ring frame") bounded by a continuous border around a central through-passage, may be constructed with surprising ease. Multiple slotted wafers are assembled, one directly upon another ("stacked"), to form the cartridge of arbitrary dimensions adapted to be removably inserted in the shell of a permeation module. Such a cartridge is post-potted. This effectively nearly eliminates the problems endemic to the construction of zero-tolerance cartridges, if it does not actually do so.

It has further been discovered that opposed portions of the slotted border of a thin, unitary laminar frame may be used to secure an array of fibers. The slotted wafer has a central through-passage (for fluid, normally a liquid feed referred to as the "substrate" or "feed") framed by the continuous, slotted border. The array consists essentially of a multiplicity of substantially linear fibers, individually secured in spaced-apart substantially coplanar relationship on the border, without stabilizing the fibers by interconnecting them to one another. The thickness of the frame is typically in the range from 1.5 times to 3 times the outside diameter of a fiber to be secured therein, and the fibers are circumferentially bonded to the border with suitable bonding means so that the circumference of each fiber is at least in "near fluid-tight" relationship with the through-passage. Plural slotted wafers are stacked to form a cartridge disposed within a shell without using mounting means. By "near-fluid-tight" is meant that the stack need only contain and hold the potting resin until it cures. If the bonding of the fibers to the borders in all wafers is fluid-tight under operating conditions, then the "post-potted" cartridge only provides insurance against leakage.

It is therefore a general object of this invention to provide a module for use as a membrane device, comprising, a shell having entrance and exit passages, and at least one post-potted cartridge, preferably a stack of such cartridges of plural unitary wafers removably disposed within the shell; each wafer contains a monolayer array of multiple, essentially linear fibers of selectively permeable material which fibers are not interconnected intermediate their terminal portions, but are disposed coplanarly in spaced-apart relationship across a central through-passage within a unitary laminar frame having a continuous but slotted border; in the slotted laminar border are the terminal portions of fibers secured non-displaceably in at least near-fluid-tight relationship with the border, near their opposite open ends which protrude through the outer periphery of the frame; plural wafers are assembled, seriatim, to provide a cartridge of vertically spaced apart arrays; an entrance passage and an exit passage in the shell each communicates with the through-passage; and, the entrance and exit passages are each sealed from the through-passage.

It is another general object of this invention to provide a novel and surprisingly effective cartridge of wafers of a monolayer array of fibers in a unitary ring frame which wafer simply avoids the problems of the prior art instead of overcoming them.

It is yet another general object of this invention to provide a low cost, low pressure shell for a module which accepts a high pressure feedstream. The fibers in each array, irrespective of their length, are unsupported within the array except near their ends, by opposed portions of the border of the frame. The length of the fibers is chosen as a function of the hydrodynamics of the feedstream.

It is therefore a general object of this invention to provide a module in which a post-potted cartridge of assembled wafers is removably inserted. The wafers are assembled in series so as to form a laminated fluid-tight conduit of axially aligned through-passages through which conduit a feedstream to be treated flows over the fibers of the arrays, in transverse flow; to provide a module in which individual fibers are essentially linearly secured under suitable tension; and, to provide a cartridge in which one or more arrays are oriented transversely to the fibers in other arrays in the cartridge.

It is another specific object of this invention to provide a cartridge of wafers each with a vertically spaced-apart monolayer of unconnected fibers, which cartridge may be tailored to provide a predetermined pressure drop of feed; and, the bores of which fibers may be tailored to provide a predetermined resistance in the flow path of permeate. The periphery of a frame, in plan view, may be of arbitrary shape (e.g. polygonal such as rectangular, hexagonal, octagonal, etc. or rounded, such as circular, elliptical, etc. but square and circular are most preferred) but each of plural frames are of identical shape so as to form the cartridge when the wafers are assembled, one atop the other. When a cartridge is to be enclosed in the shell of a module, the cartridge is positioned in the shell, longitudinally, coaxially, with or without being mounted on mounting means which traverse the cartridge. When plural cartridges are mounted in the shell, the longitudinal axis of each cartridge may be horizontally or vertically displaced relative to the longitudinal axis of the shell.

It is still another specific object of this invention to provide a simple, essentially mechanical method for insuring against leakage of substrate into the permeate into securing plural fibers in an array by adhesively securing the fibers in the surface of the frame, not upon the surface, without potting the fibers. First, the fibers are trained in coplanar, parallel, spaced-apart, relationship into longitudinal, laterally spaced apart grooves in opposed portions of the frame, and held under slight tension in the grooves. The opposed sides of the wafer are spaced apart by the length of the fibers, minus their terminal portions which are in the grooves. Second, the fibers are bonded to the frame to secure the fibers in fluid-tight relationship within the surface of the frame. This procedure is repeated until the desired number of wafers is assembled to form a cartridge. The cartridge is then potted (or post-potted) as described in detail herebelow, by flowing potting resin through all the aligned ends and slots of the cartridge, which slots are in open fluid communication, one with another, because the terminal portions of the slots of contiguous frames, overlap.

BRIEF DESCRIPTION OF THE DRAWINGS

The foregoing and additional objects and advantages of the invention will best be understood by reference to the following detailed description, accompanied with schematic illustrations of preferred embodiments of the invention, in which illustrations like reference numerals refer to like elements, and in which.

DETAILED DESCRIPTION OF PREFERRED EMBODIMENTS

The module of this invention may be used in a fluid-fluid fractionation process of choice, and more generally, in various separation processes. The module is especially well adapted for use in ultrafiltration, reverse osmosis, and gas permeation processes; it may be used for dialysis, especially as an artificial kidney, for direct osmosis, gas-gas exchanges and liquid-gas exchanges.

The fibers used in an array may be formed of any conventional membrane material whether inorganic, organic, or, mixed inorganic and organic. Typical inorganic materials include glasses, ceramics, cermets, metals and the like. Ceramic membranes may be made, for example, as described in U.S. Pat. Nos. 4,692,354 to Asaeda et al (class 472/subclass 244), 4,562,021 to Alary et al (class 264/subclass 43), and others. The organic materials are typically polymers, and are preferred, whether isotropic, or anisotropic with a thin layer or "skin" on either the bore side or the shell side of the fibers. Preferred materials for fibers are polysulfones, poly(styrenes), including styrene-containing copolymers such as acrylonitrile-styrene, butadiene-styrene and styrene-vinylbenzylhalide copolymers, polycarbonates, cellulosic polymers, polypropylene, poly(vinyl chloride), poly(ethylene terephthalate), and the like disclosed in U.S. Pat. No. 4,230,463 the disclosure of which is incorporated by reference thereto as if fully set forth herein. Preferred ceramic fibers are made from alumina, by E. I. duPont deNemours Co. and disclosed in U.S. Pat. No. 4,069,157.

The fibers are chosen with a view to performing their desired function and are non-randomly oriented in each array, and in the module, so that the flow of feed through the module is over the fibers and orthogonal thereto so as to be in transverse flow as disclosed in "Designing Hollow Fibre Contactors" by Mung-Chien Yang and E. L. Cussler in *AIChE Jour.*, 32: 1910–1916 (1986).

Fibers have an outside diameter of at least 20 μm and may be as large as about 3 mm, typically being in the range from about 0.1 mm to 2 mm. The larger the outside diameter the less desirable the ratio of surface area per unit volume of module. The wall thickness of a fiber is at least 5 microns and may be as much as 1 mm, typically being in the range from about 5% to about 40% of the outside diameter of the fiber.

The pore cross sectional average diameter in a fiber may vary widely, being in the range from about 5 to 2000 Å. The preferred pore diameter for separation of components in a liquid feedstream is in the range from about 10 to 200 Å.

The length of a fiber in an array will depend upon the strength of the fiber, its diameter, the flow rate of feed over the fibers and the pressure of the feed, its temperature, and other considerations. Since the fibers are unsupported by a frame member, they are relatively short being in the range from 5 cm to about 0.5 meter.

Figure 1:
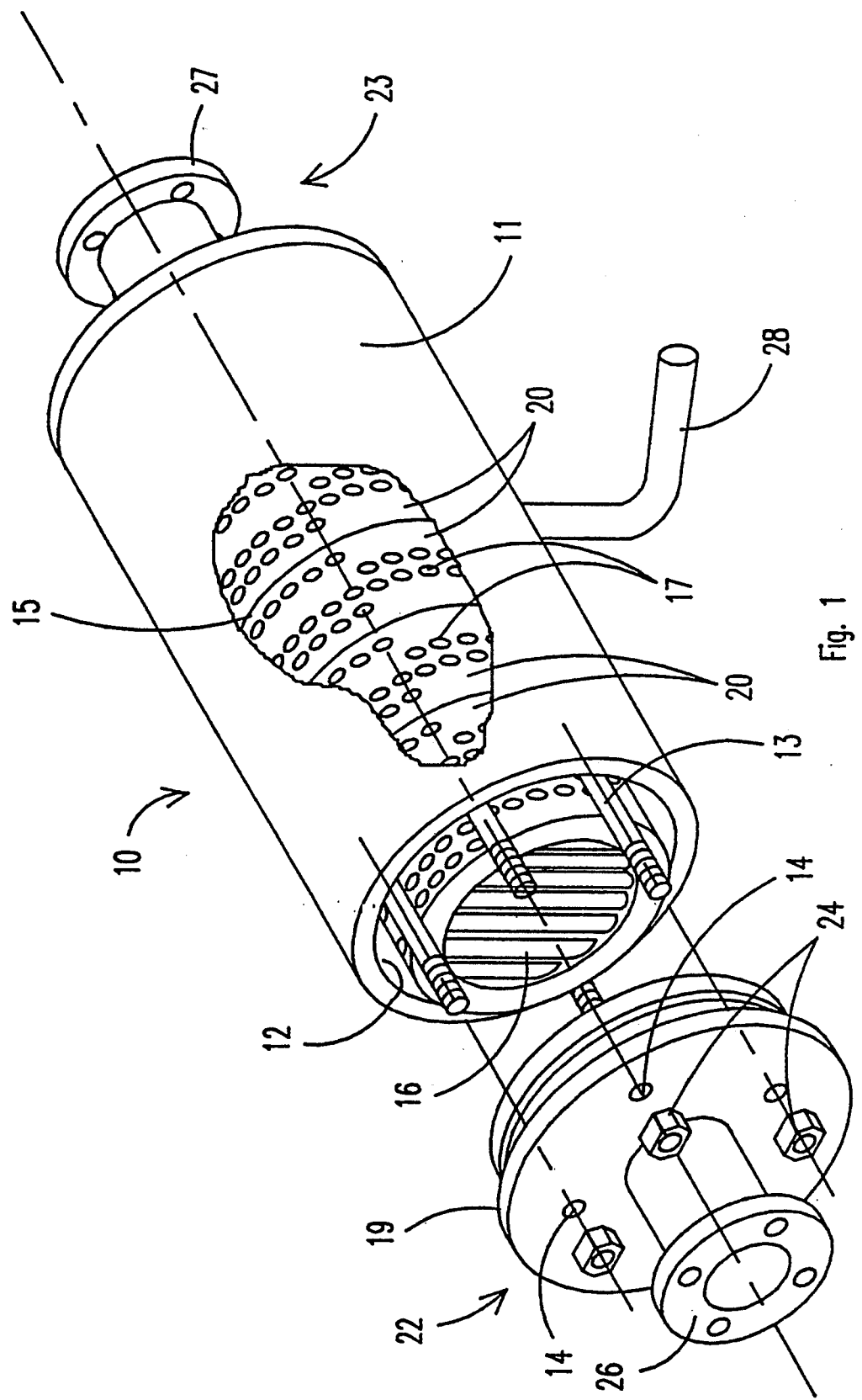
FIG. 1 is a perspective view of a module with portions broken away and exploded, diagrammatically illustrating more than four post-potted cylindrical cartridges stacked coaxially in a cylindrical shell, each cartridge constructed by sequentially forming wafers, each with an annular laminar ring frame ("ring frame" for brevity), with no tie-rod passages in the ring frame for mounting the cartridges; and arrays in successive wafers are radially displaced 60° relative to each other.

Referring to FIG. 1, there is schematically illustrated a module, in perspective view, with portions broken away, indicated generally by reference numeral 10, received within a relatively close-fitting cylindrical shell 11 to show a stack of cylindrical cartridges 20 coaxially held therewithin by tie-rods 13 having threaded ends. The tie-rods, which are equidistantly spaced along the circumference of the stack, traverse the length of the shell and the cartridges are slidably fitted therein with gaskets 15 between successive cartridges. Each cartridge is preferably made with from 10 to 50 arrays, each array having at least 2, more preferably from 15 to 500 fibers, 16, the bores 17 of which discharge permeate in a plane orthogonal to the longitudinal axis of the module.

The shell 11 may be formed from a synthetic resinous material adapted to withstand the pressure at which feed is to be treated. The shell has an inner end surface 12, only one end of which is visible, which is preferably smooth. The tie-rods 13 extend from the end of the shell and protrude through a stepped flange 19 of coupling 22 with O-rings (not shown) to seal between the tie-rods and the stepped flanges. The stepped flange 19 is dimensioned to fit inside shell 11, and against the end face of the frame of the first cartridge of the stack. The ends of the tie-rods are threaded so as to allow the stepped flange 19 to be through-bolted with nuts 24, tightly compressing the upper and lower faces of every cartridge in the assembly, one against the other, or against a gasket, in fluid-tight relation.

Essentially identical fluid couplings 22 and 23 at the ends of the shell serve to direct the flow of a feedstream over the fibers within the stack. The tie-rods 13 and nuts 24 serve to provide enough pressure on the assembly comprising the shell 11, fluid couplings 22 and 23, and the stack of cartridges 20, to confine the feedstream within the stack. Through-passages 14 are provided in coupling 22 to receive the tie-rods 13.

An O-ring (not shown) provides a fluid-tight seal between the coupling 22, especially the stepped flange 19, and the surface 12 inside the shell 11, to ensure that no portion of the permeate leaks over the exterior of the shell. Another gasket (not shown) provides a seal between the inner face of the coupling and the cartridge at each end of the stack, preventing the feedstream from leaking into the permeate side.

The two fluid couplings 22 and 23 are provided with flanges 26 and 27, respectively, for attachment to appropriate fluid conduits which deliver the untreated feedstream, and lead away the treated feedstream or concentrate. A permeate outlet from the shell is indicated at 28.

The module in the form shown in FIG. 1 is particularly well-adapted for use in a filtration operation. Fluid feed under elevated pressure typically in the range from about 100 kPa (15 psia) to about 5000 kPa, is introduced through coupling 22 to flow transversely over the fibers in the stack. Feed may enter at subatmospheric pressure if the permeate is removed under vacuum. Components of the feed capable of passing through the membranes under the transmembrane pressure generated, permeates through the walls of the fibers and into the permeate side of the shell, and leaves through permeate outlet 28, while the remaining components of the feedstream (the concentrate) leave through the coupling 23.

Since the length of fibers in an array is necessarily relatively short because they are unsupported by a frame member except near their ends, one skilled in the art is driven to use as long a fiber as one can. This is particularly true in those instances where the ratio of membrane area to the volume in which they are held (the flow-through zone provided by the conduit within the stack) is to be maximized for minimum cost.

The width of the border of a frame is sufficient to provide adequate support for, and negate damage to, the terminal portions of the fibers subjected to the force of incoming substrate and to meet the structural requirements of the module. Each section may be from about 10 mm to about 50 mm wide; the thickness depends upon the outside diameter of the fibers, and if the frame is to be grooved, or not. Preferably, if ungrooved, from 0.5 to 3 times fiber o.d.; if grooved, from 1.5 to 5 (fiber o.d.). Organic fibers typically have an outside diameter in the range from about 400 μm to about 2 mm, and wall thickness ranging from about 5 μm to about 2 mm; these dimensions are larger for ceramic fibers. Each frame is preferably formed by injection molding a suitable thermoplastic resin with the grooves and slots provided by the dies in the mold.

The void space within a stack may range from about 20% to about 95% of the internal volume of the central conduit through the stack, the void space depending upon the particular designed end use of the module. The packing density in a module is defined by membrane area per unit internal volume of module and has dimensions of inverse meter ($m^{-1}$).

In a module having X cartridges each with Y wafers, with fibers of different outside diameter (o.d.) at different center-to-center lateral spacing but the same center-to-center transverse spacing, the packing density in a module varies as illustrated in the following examples. In each case, each wafer has an array of 72 fibers, has an o.d. of 188 mm, an inside diameter (i.d.) of 155 mm, and a center-to-center transverse spacing of fibers of 2 mm.

TABLE I

| Ex | Fiber diam. mm | Wafer thk. mm | C'ter—c'ter lateral spacing | Packing density $m^{-1}$ | Void frac.* |
|---|---|---|---|---|---|
| 1 | 0.7 | 1.8 | 1.8 | 364 | 0.89 |
| 2 | 1.0 | 2.1 | 2.1 | 446 | 0.81 |
| 3 | 1.5 | 2.7 | 2.7 | 520 | 0.58 |

*void fraction in the central conduit of the cartridge.

Packing density is not a function of X and Y.

In an array, the center-to-center spacing of fibers in the horizontal plane ranges from about 1.2 to about 5 times the outside diameter of a fiber. The void fraction in the central conduit of the cartridge will vary in the range from about 0.3 to about 0.9, typically in the range from 0.4 to 0.8. The choice of fiber spacing and thickness of frame will determine packing density of the fibers. Such density is chosen to provide the maximum membrane area per unit volume of module without adversely affecting the flow of the feedstream through the stack. The result of forming a stack of cartridges and feeding the feed across the fibers is that permeate is discharged in opposite directions from the bores of fibers while the concentrate is discharged longitudinally through the module.

The length of the terminal portion of a fiber held in the frame's border will typically range from about 0.5 cm to about 5 cm, preferably from about 1 cm to about 2.5 cm, depending upon the diameter and length of the fiber between opposed portions of the border, inter alia. A fiber 0.7 mm in diam. and 10 cm long may be held by terminal portions 1 cm long near each end. A fiber of the same diameter and 50 cm long may be held by terminal portions 2.5 cm long near each end, or by only 1 cm. From about 5% to about 50% of the overall length of a fiber may be used to secure the fiber, chord-wise, in each opposed portion of a border of a frame.

It will now be evident that a stack of cartridges, bonded or gasketed one to another, seriatim, form an elongated conduit having a wall thickness which is determined by the width of the border of the frames and not the thickness of a frame. Such a frame, though relatively thin, is rigid in that, when on edge, it can only be bent around an axis which lies in the plane of the frame. The conduit is therefore able to withstand high hydraulic pressure exerted by the feed.

Unless a module is constructed with cartridges in which the fibers of at least some arrays are deliberately always in contact with fibers in a next-adjacent array, fibers in successive arrays are preferably essentially free from contact, not only with one another in the same array, but with fibers in an adjacent array. In a preferred embodiment, it is only during a module's operation, under flow conditions which cause the fibers to sag, that there may be contact between fibers in adjacent arrays.

The particular method of bonding the fibers to the frame is not narrowly critical, the choice being dependent upon the materials of the frame and the fiber, and the cost of bonding. Use of a compatible adhesive mainly ensures that the mechanical grip exerted by opposed grooves around a fiber, is fluid-tight.

Figure 2:
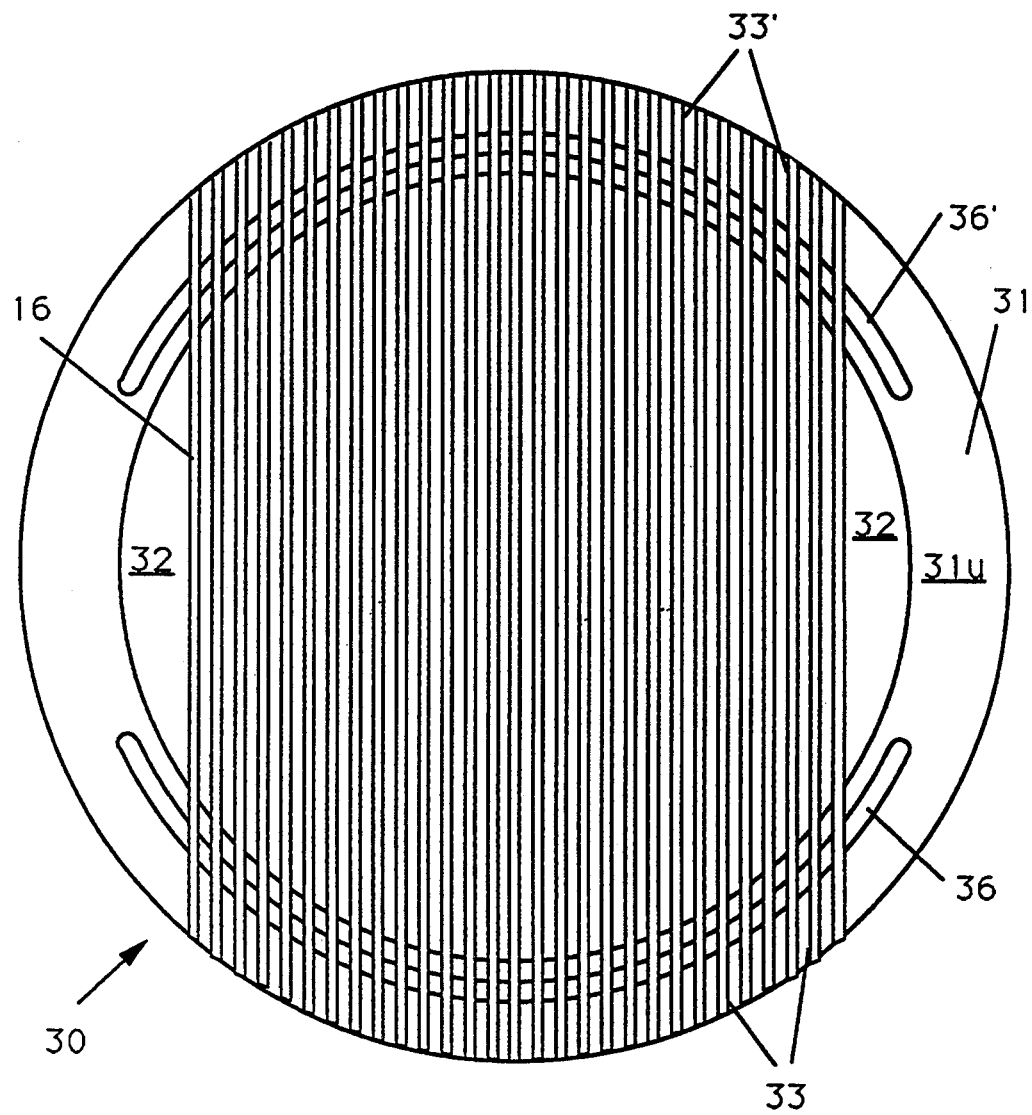
FIG. 2 is a plan view illustrating a repeating unit of the cartridge, namely a wafer having fibers adhesively secured within the slotted ring frame shown in FIG. 3.
Figure 2A:
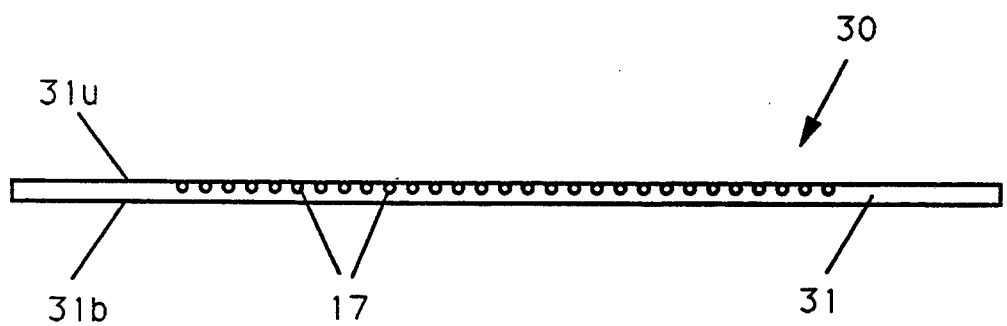
FIG. 2A is an end elevational end view of FIG. 2 showing that the fibers are held in the grooves with the upper surfaces of the fibers essentially coplanar with the upper surface of the frame.

Referring to FIGS. 2 and 2A, there is shown a wafer indicated generally by reference numeral 30, having an annular frame in the form of laminar ring frame 31 which borders (or frames) a through-passage 32. The ring is provided with directly aligned opposed sets of grooves 33 and 33' in the ring's upper surface 31u (see FIG. 2A), the grooves being slightly deeper than 'half-fiber' (or half-pipe) grooves. The grooves are chord segments adapted (see FIG. 2) to snugly accommodate individual fibers 16 of an array 34 of a multiplicity of the fibers which are coplanarly disposed in laterally spaced apart relationship in the sets of grooves 33 and 33' in the upper surface 31u. The ends of the fibers protrude through opposed points in the periphery of the opposed portions of the border, to allow the bores 17 to discharge permeate radially (relative to the axial flow of feed).

The lower (or bottom) surface 31b of the ring is ungrooved. The depth of each groove is preferably about the outside diameter of a fiber so that the upper surface of the fiber is substantially coplanar with the upper surface 31u. The depth is not narrowly critical; it can be less than the diameter of the fibers since the fibers are compressible; or it can be more than the diameter of the fibers since adhesive may be applied to fill the space around and above the fibers.

Slots 36 and 36' are cut in opposite portions of the ring frame 31. As shown, the slots are annular, the circumferential centerline of the slots being coaxial with the ring, but the shape of the slots is not critical, so long as each slot extends across the terminal end portions of all fibers in the array.

To place the fibers 16 in the grooves 33 and 33' of the ring 31 they are held by their ends in a clamping means (not shown) which is preferably grooved with corresponding grooves to facilitate positioning the fibers in the upper surface 31u. After the fibers are placed in the grooves, but before the clamping means holding them in place is released, an adhesive is applied to the tops of the fibers in the border of the frame. Preferably two circumferentially spaced-apart beads of self-leveling adhesive are applied over the upper surface of the frame, bracketing each slot 36 and 36'.

The adhesive is chosen to cure, initially, to a semi-rigid, compressible mass sufficiently rigid to hold the fibers in their grooves until the next ring is positioned. Such initial cure is preferably effected within less than 1 min, preferably less than 10 secs, and typically essentially instantaneously in less than 1 second, by a fast-acting initiator which generates free radicals, such as by exposure to a source of ultraviolet (UV) light of sufficient intensity to cure the adhesive and secure the fibers in their respective chord-wise grooves.

The clamping means are then released, and another ring 31 is placed over the just-adhesively secured fibers, and the step of forming another array of fibers is repeated.

Figure 3:
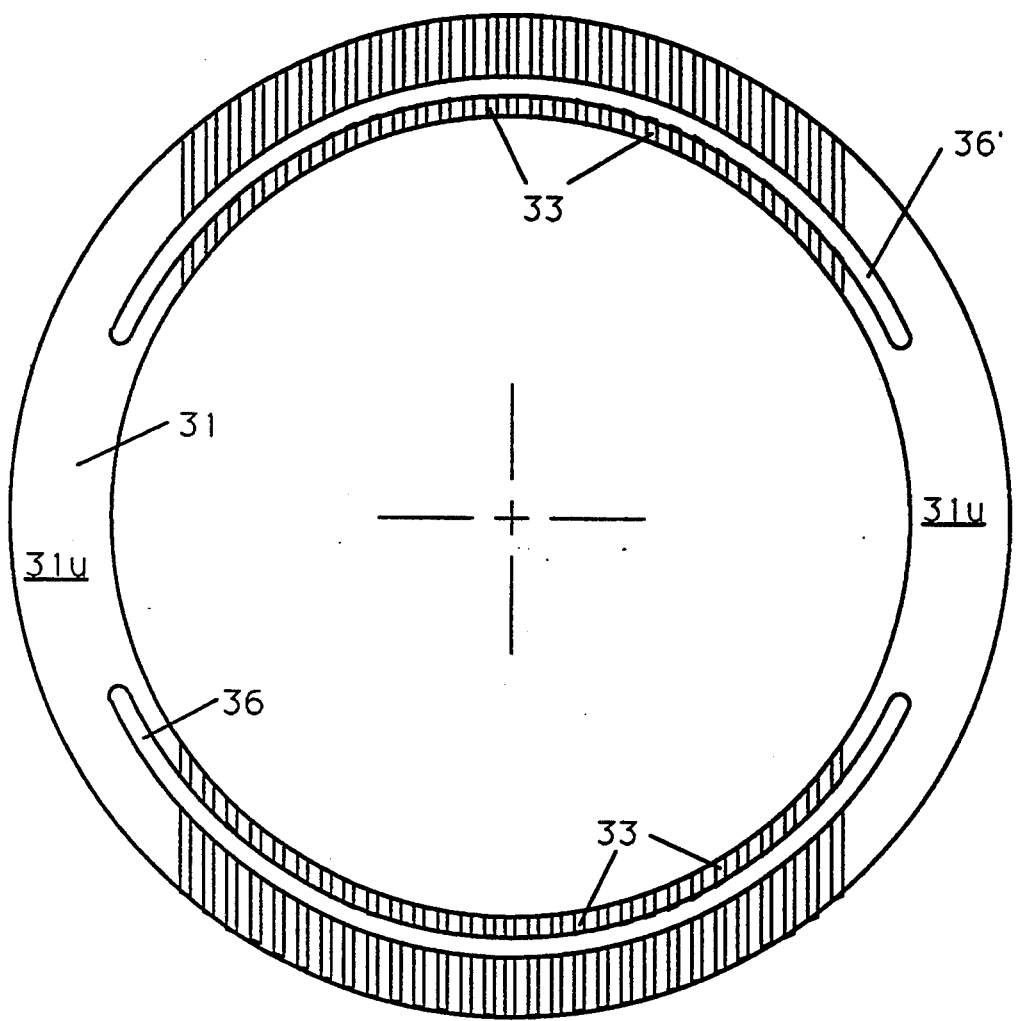
FIG. 3 is a plan view illustrating only the ring frame of a repeating unit, namely of a wafer of the cartridge, the frame having opposed parallel chordal or chord-like slots within its border, and individual grooves in the border to accommodate each fiber of an array to be secured across the feed channel defined within the border of the frame.
Figure 3A:
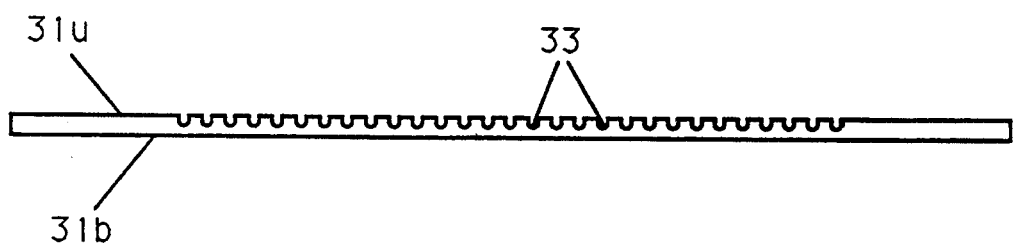
FIG. 3A is an end elevational end view of FIG. 3 showing the ends of grooves in the border of the ring frame.

As illustrated in FIGS. 3 and 3A, the ring 31 is preformed, preferably by injection molding, with the slots 36 and 36' and the grooves 33 and 33' precisely positioned in the ring 31, so that, when vertically assembled, one directly upon the other, though radially displaced, a portion of every slot in each half-section of ring is in open communication with a portion of a slot directly above it, and also with a portion of a slot directly beneath it, except of course, the bottommost and uppermost ring. The purpose of such communication is to permit resin injected into either the first or the last slot, to fill every slot in the cartridge, as will be explained in greater detail herebelow.

Figure 4:
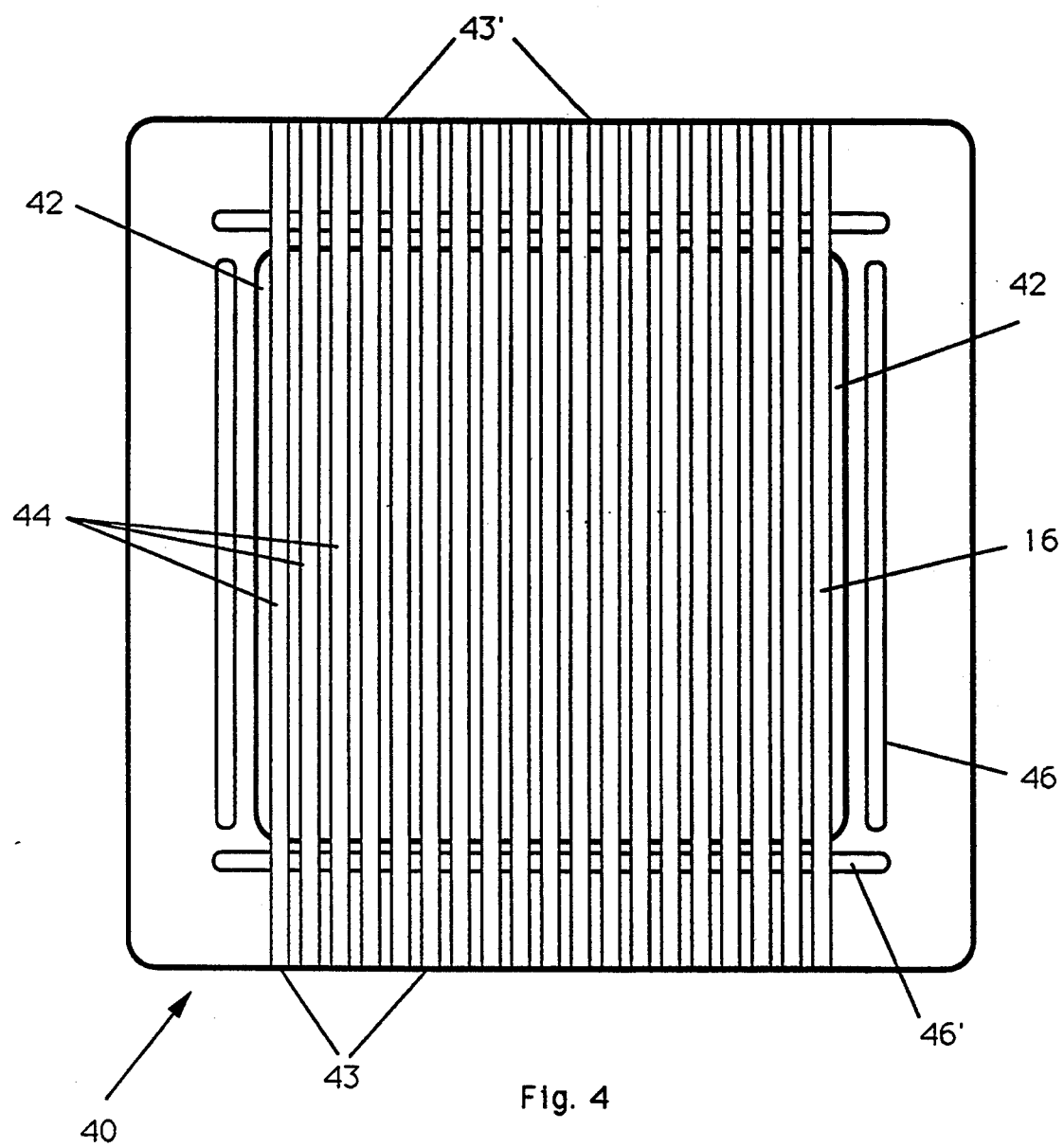
FIG. 4 is a plan view illustrating a slotted square (or rectangular) wafer having a frame (also referred to as a "ring frame, though it is square), with parallel opposed potting slots in opposed borders, and individual parallel grooves aligned in opposed borders to accommodate each fiber of an array to be secured across the feed channel defined within the border of the frame. The frame has no mounting holes because it is located and held within the shell of the module with internal spacers.
Figure 4A:
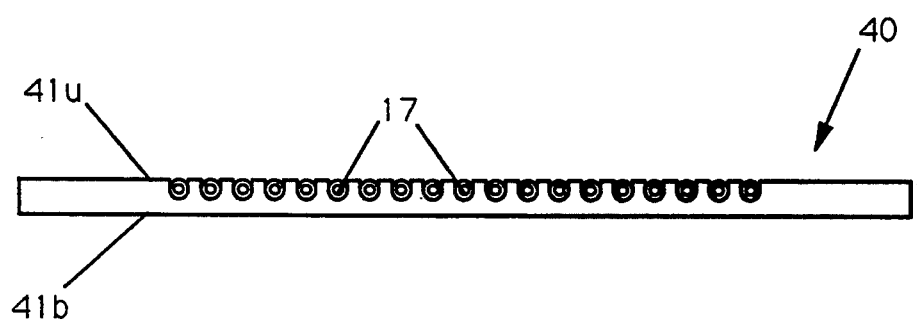
FIG. 4A is an end elevational end view of FIG. 4 showing that the fibers are snugly held, preferably adhesively secured, in the aligned grooves with the upper surfaces of the fibers essentially coplanar with the upper surface of the frame.

Referring to FIGS. 4 and 4A, there is shown a wafer indicated generally by reference numeral 40, having an annular laminar frame in the form of a square ring frame 41 which borders (frames) a through-passage 42. As in FIGS. 2 and 2A the ring is provided grooves 43 and 43' in the ring's upper surface 41u (see FIG. 4A) snugly to accommodate individual fibers 16 of an array 44 in the upper surface 41u so that permeate is discharged in opposed directions through the bores 17 of the fibers.

As in FIG. 2A, the lower surface 41b of the square ring 41 is ungrooved and the upper surfaces of the fibers 16 are substantially coplanar with the upper surface 41u.

Slots 46 and 46' are cut in opposite portions of the ring frame 41. The length of each slot is slightly greater than one-fourth the length of a side of a rectangle drawn with the longitudinal centerlines of the slots.

Figure 5:
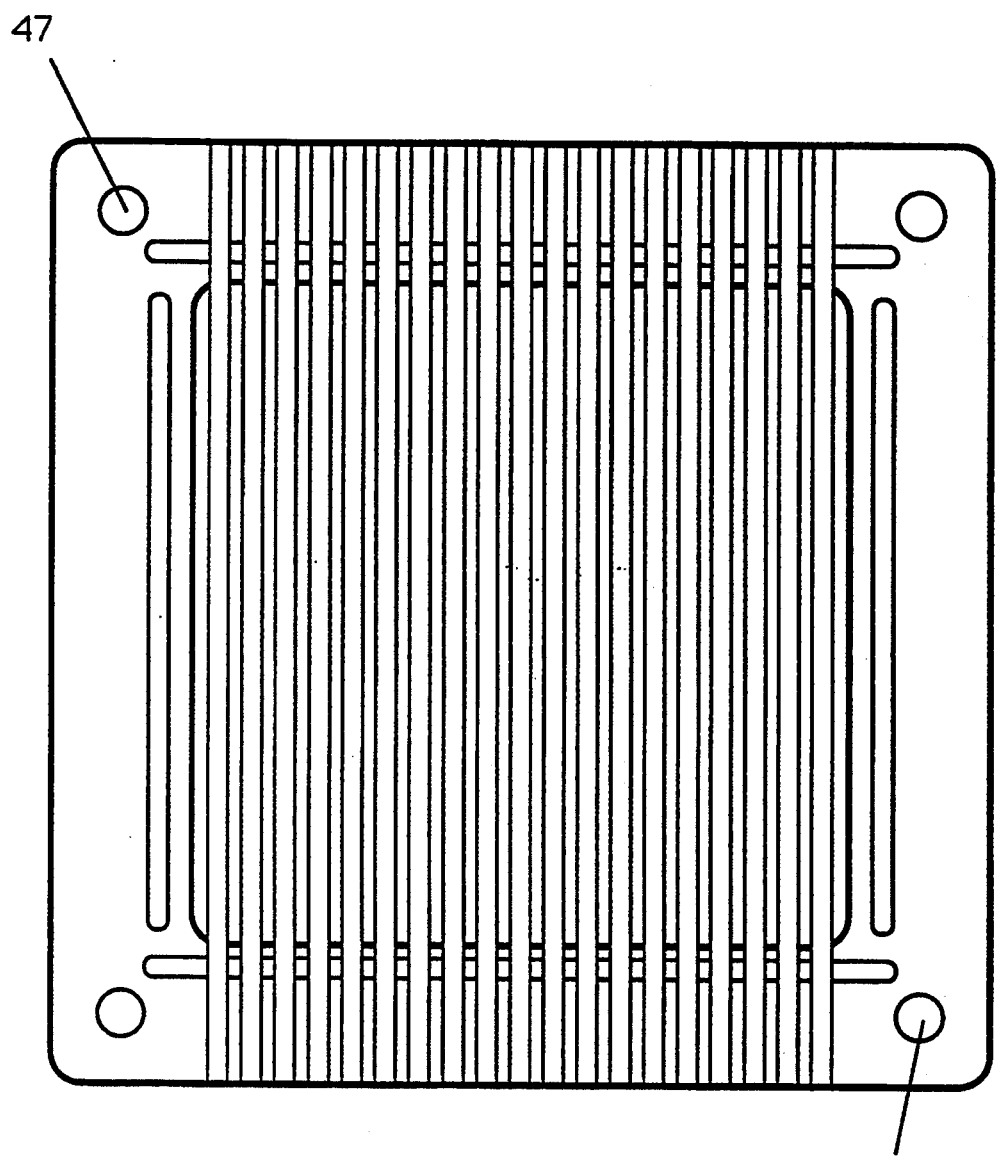
FIG. 5 is a plan view illustrating a wafer similar to the one in FIG. 4 except that the frame is provided with mounting holes through which tie rods within the module are inserted.
Figure 5A:
FIG. 5A is an end elevational end view of FIG. 5 showing fibers adhesively secured as they were in FIG. 4A.

As illustrated in FIGS. 5 and 5A, there is shown a square wafer similar to the one in FIGS. 4 and 4A, except that the wafer is provided with corner through-bores 47 through which tie-rods within a module are inserted to position and mount the cartridge.

Figure 6:
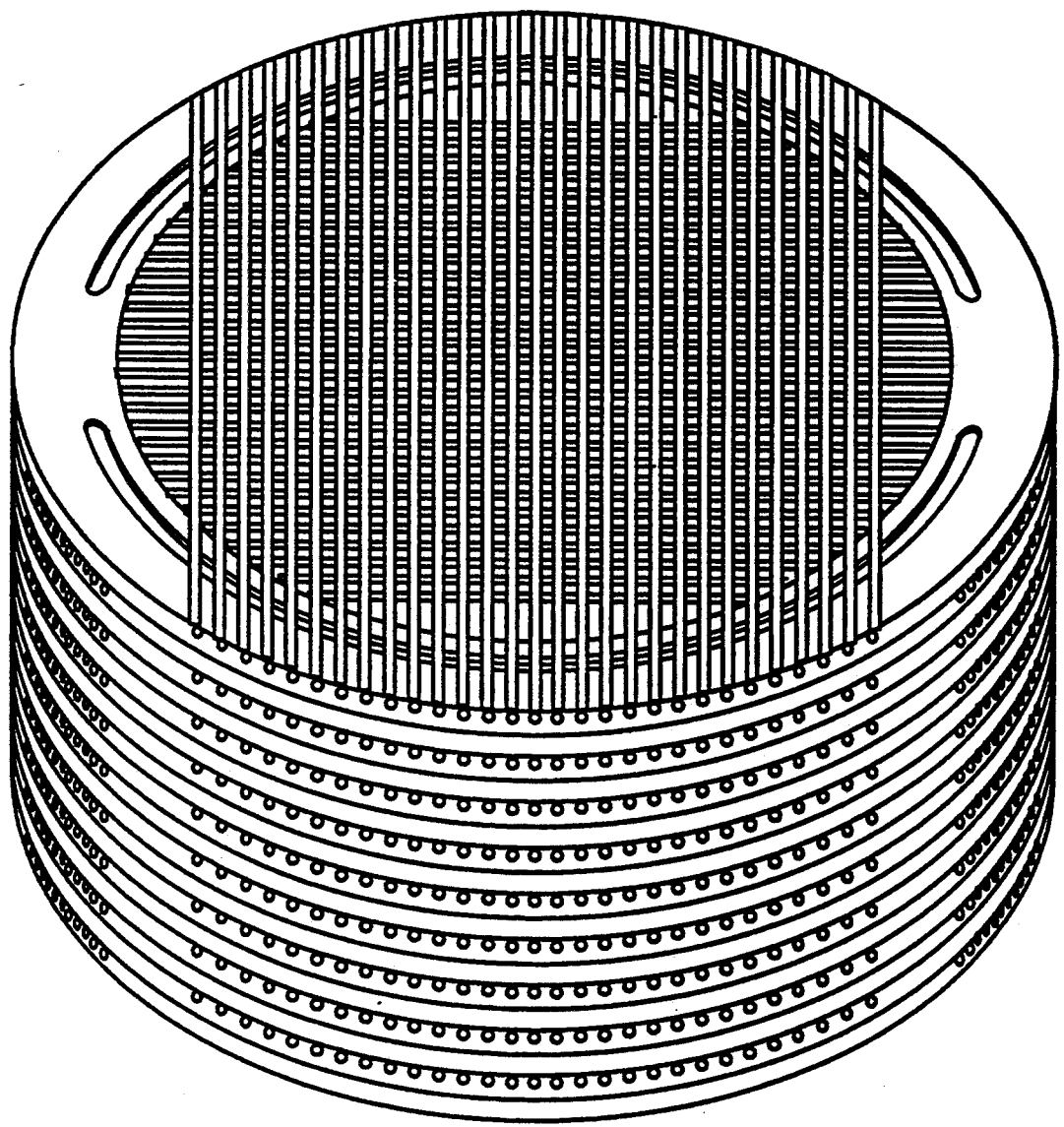
FIG. 6 is a perspective view of a cartridge used in the module shown in FIG. 1, as the cartridge is being constructed, but without the last frame which is to overlie the uppermost array, before it is potted; except the fibers in one array are shown 90° radially displaced relative to those in an adjacent array.
Figure 8:
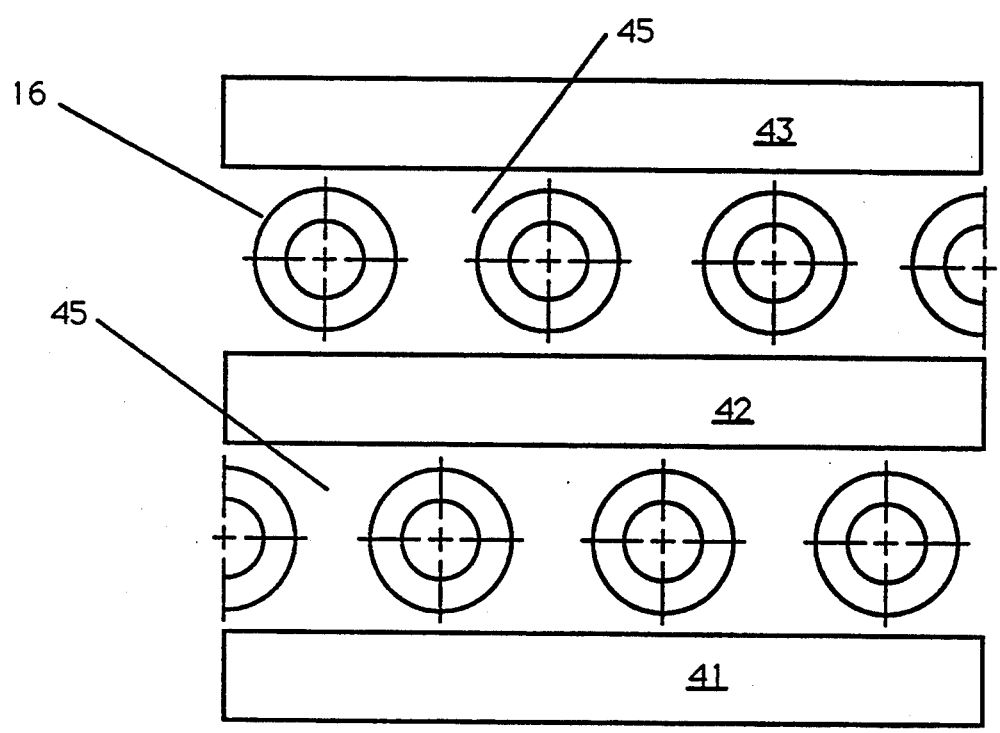
FIG. 8 is a detailed elevational view much enlarged, of a portion of the circumferential surface of a cartridge constructed with ungrooved upper and lower surfaces, showing they are adhesively bonded with a prelaid layer of adhesive about as thick as, or thicker than the diameter of a fiber; the fibers in successive arrays are staggered laterally relative to one and another so that the fibers from one array are not directly above those in a successive array.

Referring to FIG. 6, there is shown a single cartridge during construction, not yet end-capped, specifically to illustrate how the arrays of successive wafers are staggered relative to one another so as to contact fluid flowing through the through-passage more efficiently. As indicated, they are radially displaced relative to one another, but they could also be laterally displaced in vertically spaced apart relationship, as shown in FIG. 8.

Figure 7:
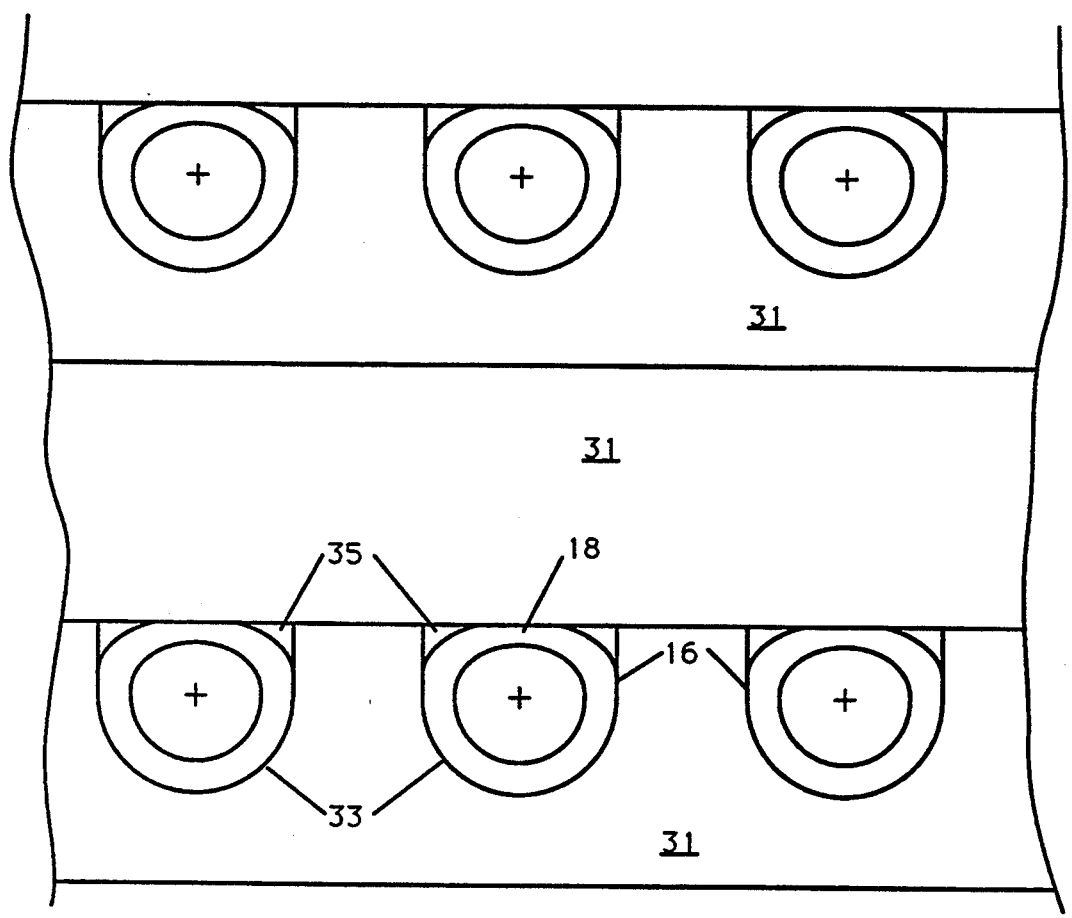
FIG. 7 is a detailed elevational view much enlarged, of a portion of the circumferential surface of the cartridge shown in FIG. 6.

As illustrated in FIG. 7 in a portion of the front surface of the cartridge shown in FIG. 6, greatly enlarged detail, the grooves 33 have fibers 16 placed and held therein by adhesive 35, and the walls 18 of fibers are slightly compressed by the next succeeding ring without significantly restricting the inside diameter.

It is desirable to minimize the thickness of the frames 31 to minimize the vertical spacing between successive arrays, but practical considerations relating to injection molding, or otherwise forming the frame from a suitable resin, and weakening of the strength of the ring, dictate that the frame be at least about 50% thicker than the outside diameter of a fiber to be held therein, and may be as much as 2 to 5 times thicker.

Ungrooved rings having a thickness from about one-half (0.5) to about one and one-half (1.5) times the outside diameter of a fiber may be used with relatively little concern for their strength. In an embodiment of a cartridge, a portion of the front surface of which is illustrated in FIG. 8 in greatly enlarged detail, the smoothly planar face of lowermost ring 41 is coated with a layer of adhesive 45 thicker than a fiber 16, and fibers are spaced apart and held until a successive (next lowermost) ring 42 is placed and pressed onto the adhesive which is then cured. More adhesive is then applied to the upper surface of ring 42, another array is held in place in the adhesive, and another ring 43 is pressed onto the upper surface of the adhesive in which the fibers are embedded. It is not narrowly critical how much pressure is applied so long as the effective internal cross-sections of the fibers are not significantly decreased.

When each successive embedded array, positioned in a coated frame, is released before a succeeding frame is placed over it, the adhesive sets (or cures) in two stages. In the first stage the adhesive sets sufficiently to hold the array in place, but is not fully set (or fully cured). The adhesive bonds the succeeding frame to the array when the adhesive is fully set in the second stage.

After an array is placed over an uncoated frame which is then coated with adhesive in an amount sufficient to embed the fibers, and then covered with a succeeding frame before the fibers in the array are released, the adhesive may be fully cured in a single step.

In the most preferred embodiment, each slot 36 and 36' has a circumferential length greater than one-fourth the circumferential length of the centerline of the slots, so that the terminal portions and ends of each slot overlie the terminal portions and ends of another directly above, as well as one directly below each ring, when the slots are radially displaced (staggered) relative to one another. In this manner, adhesive injected into the first or last slot, flows through all slots in the cartridge forming an annular shell of potting resin within which the terminal portions of all fibers are sealingly bonded.

If the circumferential lengths of each slot 36 and 36' was less than one-fourth the circumferential length of the centerline of the slots, the terminal portions and ends of each slot will overlie the terminal portions and ends of another directly above, as well as one directly below each ring, only if the slots are not radially displaced so much as to have the terminal portions of each slot misaligned. If there is such misalignment, then more than one location will be necessary for injection of the potting resin.

Figure 9:
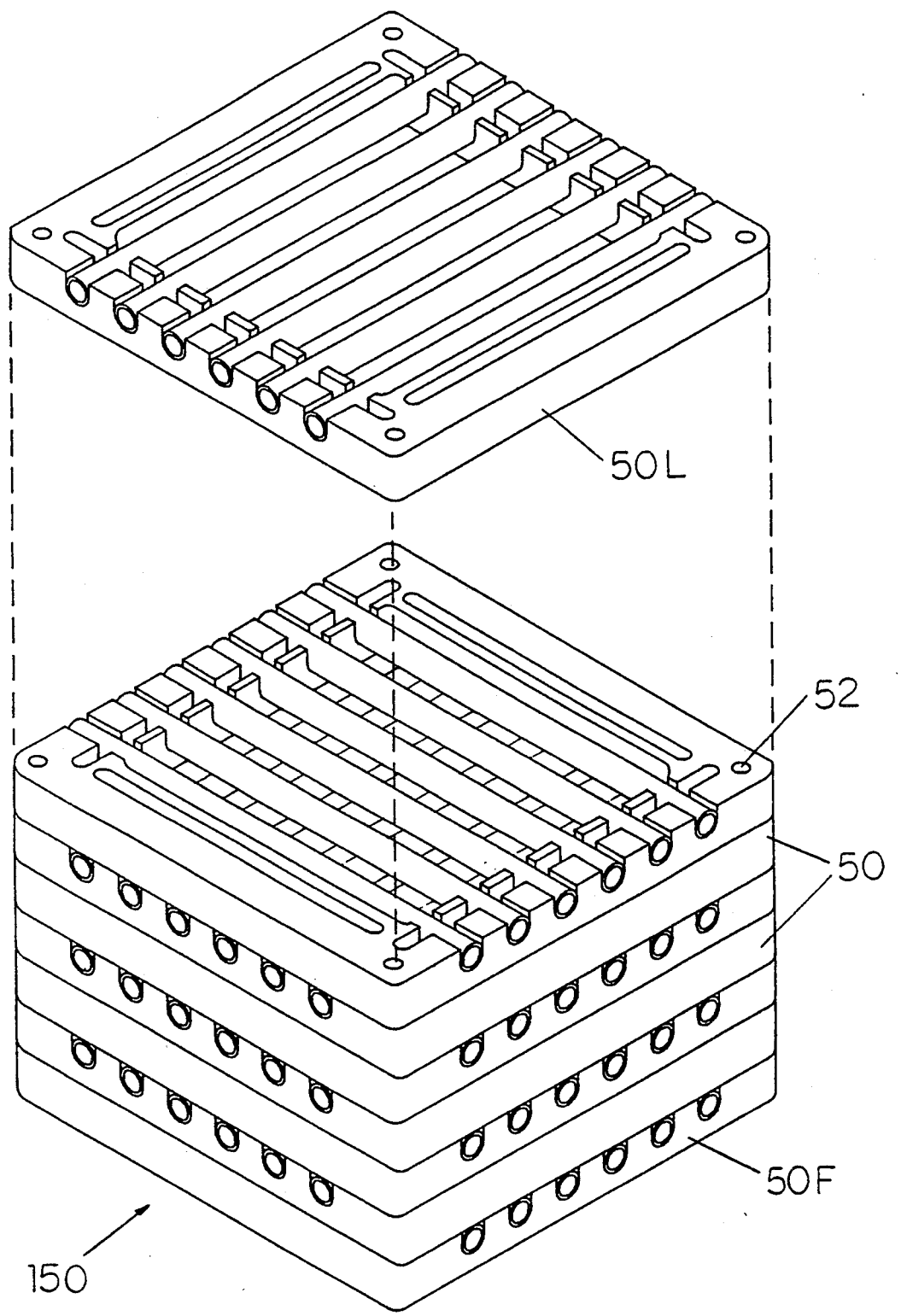
FIG. 9 is a perspective view of a cartridge of square slotted wafers bonded one upon the other, with the topmost wafer exploded away from the cartridge.

Referring to FIG. 9 there is schematically illustrated how a cartridge 150 is assembled by placing individual wafers 50, as illustrated in FIG. 5, one upon another, starting with the first wafer 50F and finishing with the last wafer 50L.

Figure 10:
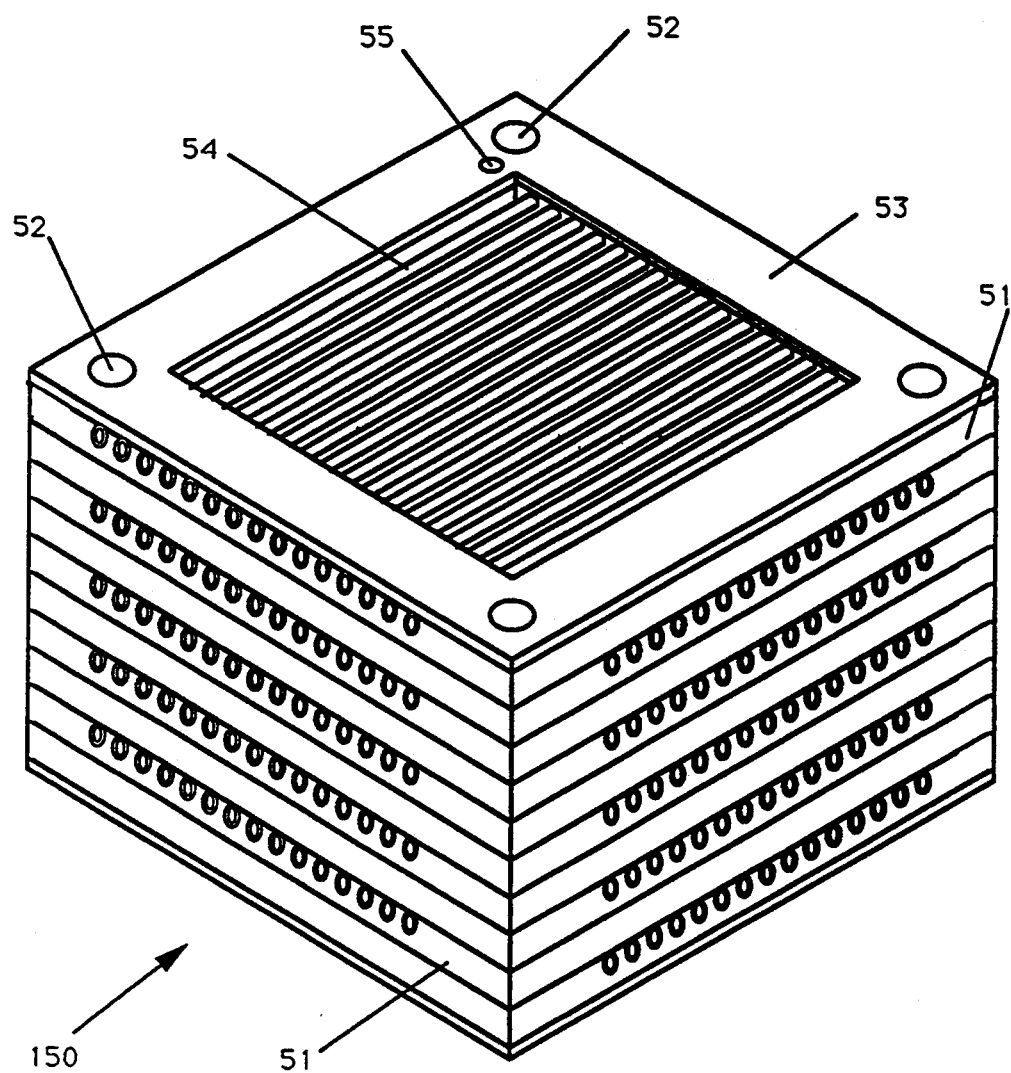
FIG. 10 is a perspective view of a cartridge of square slotted wafers with its uppermost cover plate, and its bottom plate, both of which plates are used to contain potting resin before it fills the slots; the cartridge has no corner mounting through-passages. Through-passages may be provided in the corners if mounting the cartridge within the shell is desirable; such through-passages extending from the uppermost cover plate, through all wafers of a cartridge, and through the bottom plate, will not of course, be filled with the potting resin used to seal the terminal end portions of the fibers in the slots.

As illustrated in FIG. 10, after the last wafer 50L is placed on the assembly, and sandwiched between a cover plate 53 and a bottom plate 57 before inserting locating rods (not shown) through the tie-rod holes 52. The cover plate 53 has a potting hole 55 in it, as does the bottom plate 57 so that liquid resin can be flowed across all slots in the cartridge. The cartridge 150 is then clamped with clamps (not shown) between upper and lower potting plates 113 and 114 respectively to provide a near-fluid-tight zone around the exposed fibers. The cartridge is then post-potted with a conventional potting resin (not shown) injected into potting hole 55 under low pressure sufficient to fill potting channels formed by successive slots in each wafer, using the upper and lower potting plates 53 and 57, respectively, as will be described hereafter.

Figure 11:
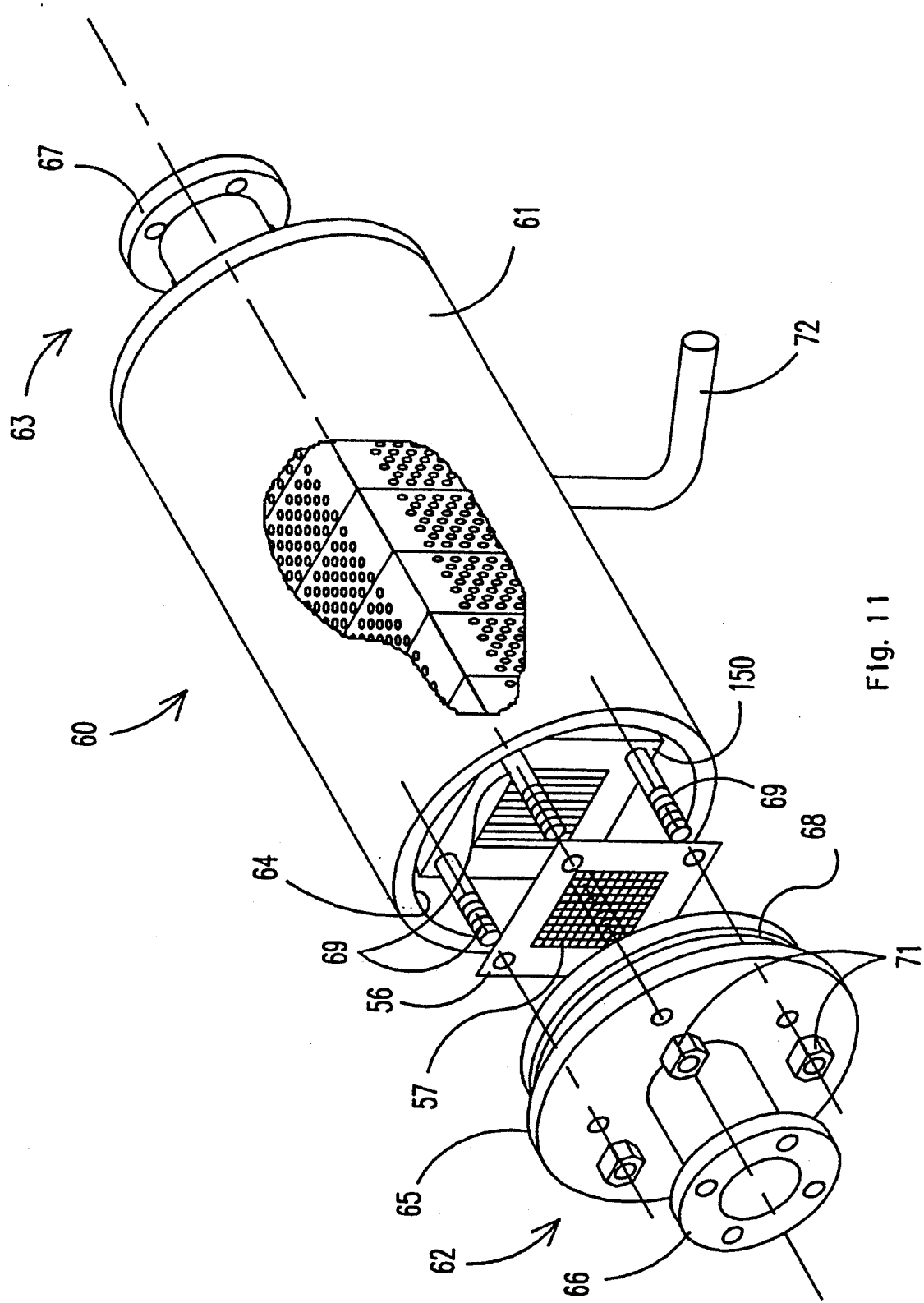
FIG. 11 is a perspective view of a module with portions broken away and exploded, showing more than four (4) square cartridges stacked coaxially in a cylindrical shell, each cartridge having corner through-bores (tie-rod passages) for mounting and positioning it in the shell; each cartridge is constructed by sequentially forming wafers, each with an annular laminar square ring frame with the tie-rod-passages in the rectangular frame for mounting the cartridges; and fibers in successive wafers in each cartridge are radially displaced 90° relative to each other.

When several cartridges 150 are operatively disposed within a module, along its longitudinal axis, as shown in FIG. 11, the fibers are oriented in the vertical and horizontal directions (preferably alternatingly), both of which directions lie in a plane at right angles to the longitudinal axis.

The cartridges illustrated herein are made with either rectangular or circular wafers. Stacks with geometries having still other peripheries (for example, a rectangle with unequal sides, or, an ellipse) may be constructed in an analogous manner, if desired, but square and circular stacks are most preferred, for obvious reasons.

Irrespective of the shape of the periphery of the stack, the fibers must resist the drag force of the feedstream without being damaged. This requires that the tension in the fibers be maintained below a force which is sufficient to extend the fiber beyond its elastic limit.

The manner in which the ring frames of the wafers are bonded, one to another, is not critical so long as the inner opposed surfaces around the central conduit, and the outer surfaces of the fibers are in close contact, sufficient to present a high enough flow resistance for potting resin to prevent its flow through the walls of the cartridge when potting resin is injected into the slots. The locations of the fibers in the array, namely their longitudinal and transverse pitches, are determined by the grooves. Unless a module is constructed with cartridges in which the fibers of at least some wafers are deliberately always in contact with fibers in a next-adjacent wafer, fibers in successive wafers are preferably essentially free from contact, not only with one another in the same wafer, but with fibers in an adjacent wafer. In a preferred embodiment, it is only during a module's operation, under flow conditions which cause the fibers to sag, that there may be contact between fibers in adjacent wafers.

Neither is the particular method of bonding the fibers to the frame of a wafer narrowly critical, the choice being dependent upon the materials of the frame and the fiber, and the cost of bonding. Use of a compatible adhesive mainly ensures that the mechanical grip exerted by the opposed grooves around a fiber, is fluid-tight. It is not essential that the fibers be assembled in fluid-tight relationship with the sections of a ring in which they are held as long as they are in near-fluid-tight relationship. Therefore minimal attention is paid to smearing an appropriate adhesive over the opposed faces of each section, and optionally, the fibers, and pressing the sections against each other. In many instances, the fibers may not be adhesively secured within the frames if the fibers are snugly held in the grooves until the cartridge is potted. Preferred adhesives are polyvinyl ethyl ethers, copolymers of acrylate ester with acrylic acid, epoxy resins and the like which form a near-fluid-tight bond between the fibers and the sections of the wafer frame.

Bonding of frames may also be effected by "welding" the surfaces to be joined by temporarily changing them to a plastic state, whether fluid or semi-fluid, at the interface of the joint. Such "welding" may be effected by solvent welding, or by pressing preheated molten surfaces together while in the plastic state; or by the use of heat energy-creating techniques such as heating with hot air, or vibration welding; all the foregoing techniques being well known to be readily adaptable for the purpose at hand by one skilled in the art. More preferred is the use of ultrasound waves for ultrasonic welding, or welding by dielectric heating, as described for example in U.S. Pat. No. 3,620,875 to Guglielmo, requiring the use of a ferromagnetic filler in a strip interposed between the sections of the frame and fiber. A preferred choice of materials for the frame and the fibers is one in which the materials are weld-miscible so that the lap strength of the resulting weld is comparable to that of one of the materials itself.

The materials for the sections of the frame are most preferably either thermoplastic or thermosetting synthetic resinous materials, optionally reinforced with glass fibers, boron or graphite fibers and the like. Thermoplastic materials are preferred for relatively low temperature service below 100° C., these being chosen so as to be sufficiently compatible with the material of the fibers to produce a lasting, fluid-tight bond after the cartridge is potted. Such thermoplastic materials may be crystalline, such as polyolefins, polyamides (nylon), polycarbonates and the like; semi-crystalline such as polyetherether ketone (PEEK); or, substantially amorphous, such as poly(vinyl chloride) (PVC) and the like.

The number of fibers in an array is arbitrary, typically being in the range from about 10 to about 1000, depending upon the diameter of the ring frame and the diameter of the fibers.

In FIG. 11 there is shown a module 60 in which is mounted a stack of rectangular cartridges 150. In a manner analogous to that described in FIG. 1, the module is provided with a cylindrical shell 61, and flanges 66 and 67 on couplings 62 and 63, respectively, between which the stack is held. The inner diameter of the shell is preferably just larger than the diagonal of a cartridge but the inner surface 64 of the shell does not need to guide the cartridges into position. An O-ring 68 provides a seal between the coupling 62 and the inner end of shell 61. The cartridges are mounted by passing tie-rods 69 through passages in the corners of the cartridges. Threaded ends of the tie-rods project through stepped flange 65 which is secured in position with nuts 71. A screen 56 with a mesh interior 57 is provided at the feed end of the module to filter out large particles. Feed is introduced through coupling 62, concentrate leaves through coupling 63, and permeate leaves through outlet 72.

It will now be appreciated that another module, analogous to the one shown in FIG. 11 (say), may be used as a mass transfer device to perform fluid-to-fluid transfer operations between any appropriately chosen first fluid flowing through the lumen of the fibers 16, and another appropriately chosen second fluid flowing through the stack externally to the fibers, provided the module is also fitted with an inlet (not shown) for the first fluid. The outlet for the first fluid is furnished by the permeate outlet 72 of the module. To force the first fluid to flow through the lumen of the fibers, appropriate fluid-tight seals are provided between the inside surface of the shell and the periphery of the stack of cartridges.

The number of fibers in an array is arbitrary, typically being in the range from about 10 to about 1000. By way of illustration, if each wafer is 30 cm in diameter, 150 fibers each having an o.d. of 1.0 mm may be used in an array.

Numerous variations in arrangements of stacks, either in parallel or in series, may be contrived depending upon the particular material being treated, the efficiency or degree of separation sought, and the volume of fluid to be treated in a single module. In most applications, banks of modules are used, each containing a single stack of cartridges because the use of plural stacks in a module exposes it to a high risk of failure of seals between stacks.

It will now be evident that the apparatus and basic separation process of this invention may be used in the recovery and separation of a wide variety of commercially significant materials some of which, illustratively referred to, include (a) the recovery of water from brackish or sea water; (b) the recovery and concentration of salts, particularly those of ammonium, the alkali metal and alkaline earth metals such as the halides, sulfates, sulfites nitrates and hydroxides; and organic fluids including glycerine, lactic acid, alcohol, glycols and tanning extracts; (c) ion exchange processes; and, (d) separation of components which normally form azeotropes or have substantially the same boiling points, or ammonia from fluid organic amines; treatment of industrial waste streams such as radioactive waste, sulfite pulps, cannery waste, and the like.

In general any of the foregoing processes will benefit from method of using the module having the structural features described hereinabove. In those processes in which one component of a feedstream is to be separated from at least one other component therein, the feedstream is flowed over the fibers in a direction essentially orthogonal to the plane in which the fibers lie; that portion of the feedstream which permeates the walls of the fibers into the permeate zone is collected and conducted away from the permeate zone; and, concentrate which does not permeate the walls and remains in the feed zone is flowed away from the feed zone and out of the module.

Having thus provided a general discussion, described the overall module in detail and illustrated the invention with specific examples of the best mode of making the wafers and post-potting the cartridge, it will be evident that the invention has provided a simple but effective solution to a difficult problem. It is therefore to be understood that no undue restrictions are to be imposed by reason of the specific embodiments illustrated and discussed, or restricted to a slavish adherence to the details set forth herein.

We claim:

1. In a cartridge to be inserted in a module for use in a membrane device, the improvement comprising, plural repeating units, each being a unitary wafer consisting essentially of
   (i) an array comprising a single monolayer of individual spaced apart hollow fibers of selectively perucable material secured near their terminal portions in near-fluid-tight relationship therewith, without being interconnected intermediate said terminal portions, each said array held non-displaceably by said terminal portions in
   (ii) a unitary laminar frame having a continuous periphery, a through-passage within said frame defining a perforate planar border having opposed elongated slots within opposed portions of said border, within which border said fibers are secured;
   (iii) a multiplicity of said unitary laminar frames assembled vertically, one in direct contact upon another, so that said opposed end portions of elongated slots in successive said laminar frames are in open fluid communication with one and another; and,
   (iv) an end unitary laminar frame secured in fluid-tight relationship with the last and uppermost array,
whereby each array is sandwiched between an upper and a lower frame so that a predetermined number of arrays "n" have been sequentially secured in position, each in fluid-tight relationship with the preceding prior array, and capped by said end unitary laminar frame, so that the number of arrays held between successive frames is one less than the number of frames in which the fibers are held, where n represents an integer greater than 2.

2. The unitary cartridge of claim 1 wherein,
   (i) said through-passage within a multiplicity of said frames provides a fluid-tight axial conduit having open ends;
   said fibers have bores in open fluid communication outside said cartridge, said bores being disposed so as to duct fluid in opposite directions;
   (ii) each of said opposed portions of said border has lateral grooves which provide a through-passage in the plane of the fibers, said grooves being adapted snugly to embrace terminal end portions of each fiber so that fibers of an array lie in parallel spaced-apart relationship in a plane substantially orthogonal to said axial conduit, and the fibers of one array lie transversely to those of another array;
   (iii) said opposed end portions of said elongated slots, together with said slots in successive said laminar frames form a potting channel traversing the longitudinal axial length of said cartridge;
   (iv) an annular shell of potting resin filling said potting channel and potting said fibers near their ends.

3. The unitary cartridge of claim 2 wherein,
   (i) each opposed portion of said border has a width sufficient to negate damage to terminal portions of said fibers when subjected to a drag force produced by a feedstream flowing axially within said through-passage;
   (ii) the number of said grooves in each said opposed portion of said border are equal to the number of said fibers, each groove having an arcuate profile adapted to snugly embrace a corresponding arcuate portion of one of said fibers near one of its ends;
   (iii) said grooves in one of said opposed portions of said border are spaced apart with the same spacing as each groove in the other of said opposed portions of said border; and, said fibers are secured within said opposed portions of said border with
   (iv) bonding means to bond said terminal portions of said fibers to said laminar frame in at least near-fluid-tight relationship.

4. The cartridge of claim 3 wherein said fibers have an outside diameter in the range from about 100 $\mu$m to about 10 mm, and a wall thickness in the range from about 5% to about 40% of said outside diameter.

5. The cartridge of claim 4 wherein said fibers are made from an organic polymeric material, a fiber having an outside diameter in the range from about 0.1 mm to 2 mm.

6. The cartridge of claim 4 wherein said fibers are made from an inorganic material, a fiber having an outside diameter in the range from about 3 mm to 13 mm.

7. A module for use as a membrane device, comprising,
   a shell having entrance and exit passages;
   a pair of end closures with fluid couplings removably affixed to each of said ends of said shell;
   at least one cartridge disposed within said shell, said cartridge having walls defining a conduit for fluid flowing therethrough, each wall defined by the width of the border of a unitary slotted wafer, said each wall having a longitudinal channel therewithin filled with a cured synthetic resinous material, said cartridge comprising plural repeating units of said unitary slotted wafer comprising
   (i) an array of individual spaced apart hollow fibers of selectively permeable material bonded to said border near their opposed terminal portions in near-fluid-tight relationship therewith, without being interconnected intermediate said terminal portions, each said array held non-displaceably by said terminal portions in
   (ii) a unitary frame having a continuous periphery, a through-passage within said frame defining a perforate planar border having a slot within said border within which said fibers are secured on said planar surface of said border;
   an entrance passage in said shell communicating with said through-passage;

an exit passage in said shell communicating with said through-passage; and, sealing means between said through-passage and said entrance passage, and between said through-passage and said exit passage.

8. The module of claim 7 wherein said hollow fibers have an outside diameter in the range from about 400 μm to about 2 mm, and a wall thickness in the range from about 5% to 40% of said outside diameter, and said border is sufficiently wide to negate damage to terminal portions of said fibers when subjected to a drag force produced by a fluid stream flowing transversely over said fibers.

9. The module of claim 8 wherein said frame has a thickness in the range from about 0.5 to about 5 times the outside diameter of said fibers, said frame includes through-passages for mounting means, and is formed from a synthetic resinous stock.

10. The module of claim 8 wherein a feedstream is flowed though said entrance passage, concentrate is removed from said exit passage, each array of fibers discharges permeate in opposite directions into a permeate zone, so that permeate is discharged in directions in a plane orthogonal to the longitudinal axis of said cartridge, and said shell includes means to remove said permeate from said permeate zone.

11. The module of claim 10 wherein the void fraction within said cartridge is in the range from about 0.3 to about 0.95, and said fibers are held in said wafers by terminal portions which range from about 4% to about 20% of the overall length of the fibers.

12. The module of claim 11 wherein said fibers are essentially free from contact, one with another, in each array, and from one array to another, except during flow of fluid through said cartridge under flow conditions sufficient to produce a sag in said fibers.

13. The module of claim 7 wherein said cartridge is disposed in said shell so that the peripheral surface of said cartridge is spaced apart from said shell's inner surface to provide a channel for fluid, without mounting means inserted through said wafers.

14. The module of claim 7 wherein said terminal portions are secured with an adhesive having an initial cure time in the range from about 1 second to about 1 minute, after which initial cure the adhesive is compressible.

15. The module of claim 7 wherein said terminal portions are secured with an adhesive having a setting time in the range from about 1 second to about 1 minute.

16. The module of claim 7 wherein said pair of end closures are removably affixed to each of said ends of said shell, and said module is disposable.

17. The module of claim 7 wherein said unitary frame is a laminar frame, and said terminal portions are disposed, each individually, in a multiplicity of chord-wise laterally spaced-apart aligned grooves in opposed portions of said border and in the same plane, each groove adapted to embrace a terminal portion of one of said hollow fibers.

18. The module of claim 17 wherein said laminar frame is a ring.

19. The module of claim 17 wherein said laminar frame is a rectangular frame.

20. The module of claim 17 wherein said frame has a thickness in the range from about 1.5 to about 5 times the outside diameter of said fibers, and is formed from a synthetic resinous stock.

21. The module of claim 7 wherein plural cartridges are coaxially aligned and secured in fluid-tight relationship.

22. The module of claim 7 wherein said cartridge is removably disposed within said shell.

23. A method for forming a cartridge for use in a membrane device, said cartridge comprising plural repeating units of wafers each consisting essentially of a unitary frame and an array of hollow fibers which are not potted, said method comprising, (i) positioning a first frame having a central passage therein and a border framed by the passage, said border having a longitudinal post-potting slot therein;

(ii) coating said border with an adhesive;

(iii) training all fibers in an array in coplanar, parallel, spaced-apart relationship onto opposed portions off the frame's border;

(iv) initially curing said adhesive sufficiently to hold said terminal portions in position;

(v) positioning a second frame and securing it to said first frame with said array held therebetween;

(vi) repeating steps (ii) (iii), (iv) and (v) until a predetermined number of arrays have been sequentially secured in position, each in fluid-tight relationship with the last prior array; and, (vii) capping the last-positioned array with an end frame to complete said cartridge which is non-disassemblable.

24. The method of claim 23 wherein each said wafer is set in fluid-tight relationship with the last prior wafer, within 5 minutes.

25. The method of claim 24 wherein, after securing said second frame to said first frame in step (v), severing protruding ends of fibers.

26. The method of claim 24 wherein, after capping the last-positioned array with an end frame in step (vii), severing protruding ends of fibers.

* * * * *